United States Patent [19]

Haulk

[11] Patent Number: 4,467,550
[45] Date of Patent: Aug. 28, 1984

[54] FISHING LURE

[76] Inventor: Elvro L. Haulk, 1544 N. Stewart Rd., Mansfield, Ohio 44903

[21] Appl. No.: 294,450

[22] Filed: Aug. 20, 1981

[51] Int. Cl.³ ...................... A01K 85/00; A01K 95/00
[52] U.S. Cl. .................................. 43/42.53; 43/43.12; 43/44.97
[58] Field of Search ................. 43/43.12, 44.96, 44.97, 43/42.53; 24/213 C, 215

[56] References Cited

U.S. PATENT DOCUMENTS 3,500,576  3/1970  Ostrom .............................. 43/43.12

Primary Examiner—Nicholas P. Godici
Assistant Examiner—Marc Hodak
Attorney, Agent, or Firm—Pearne, Gordon, Sessions, McCoy, Granger & Tilberry

[57] ABSTRACT

A fishing lure is disclosed having a keel wire formed of spring material shaped to removably retain a barrel weight thereon. The weight can be changed to change the running depth of the lure by merely slipping the weight off the wire and slipping on a substitute weight of different size. The force required to remove the weight is selected to be lower than the force required to break the associated fishing line so that the lure can be retrieved when the weight becomes snagged by pulling the keel wire out of the weight.

3 Claims, 5 Drawing Figures

FISHING LURE

The present invention relates to fishing lures. More specifically, the present invention embodies a novel and improved, low-cost fishing lure which incorporates a weight that can be easily changed to change the lure's running depth and which can slip off to allow lure retrieval if the weight becomes snagged.

PRIOR ART

A principal disadvantage of fishing lures has been their tendency to snag on underwater obstacles by engaging the obstacle with the body or hooks of the lure. To overcome this problem, various anti-snag devices have been fitted to lures. One such device embodies trailing wires attached to the lure which serve to deflect the plant material or the lure so that the lure does not bcome snagged. One such lure is disclosed in my U.S. Pat. No. 3,131,504, which is incorporated herein by reference. The lure of such patent provides two depending wires each of which is provided with a weight. Another similar type of prior art lure is illustrated in FIG. 5. Such lure provides a single, depending keel wire on which a lead barrel weight is mounted. Such lures provide good casting characteristics, and are stabilized by the weights so that line twisting does not occur during retrieval. Further, with such lures it is possible, with some difficulty, to change the weights to change the running depth. For example, in the lure of FIG. 5, the end of the wire can be straightened with pliers to remove one weight and substitute another of different size. However, if this is done repeatedly, the wire fatigues and breaks, preventing continued proper use of the lure.

Further, in both such lures it is difficult to free the lure if the weight becomes snagged, and in such instance the entire lure is often lost.

SUMMARY OF THE INVENTION

In accordance with the present invention, an improved lure is provided having a keel wire weight combination which is structured to allow the easy changing of the weight as many times as desired without the use of tools of any kind. The wire is shaped so that the weight can be slipped on or off the wire with ease and so that when installed it is sufficiently well retained on the wire to stay in place during casting and retrieval. Therefore, with this invention, a fisherman can easily change weights to provide the lure with the particular lure running depth desired.

Further, with this invention, the lure can be easily retrieved even if the weight becomes snagged. If the weight becomes snagged, sufficient pull can be applied to the lure by the fish line to cause the wire to slip out of the weight. In such instance, the lure itself is retrieved and only the low cost weight portion of the lure is lost. Thereafter, a new weight is installed and the lure is ready for continued use.

These changes are achieved with the present invention without requiring additional material for the lure manufacture and, in most instances, are achieved with savings in the labor cost in producing the lure.

In the illustrated embodiment, these advantages are achieved in a lure which tends to run upright, and is formed from one piece of wire, at low cost, with a minimum of mechanical operations. It should be recognized, of course, that the present invention may be incorporated into a lure of many other constructions. In the illustrated lure, the keel wire is formed by bending a single piece of wire upon and around itself to form a loop for attaching fishing line and the body wire of the lure. The remaining end of the body wire is then bent upon itself to form a hook retaining eye, through which a hook of desired configuration is inserted, and the residual wire secured to the main body wire with a bead which also serves as a simulated insect body part.

A barrel weight is removably attached to the keel wire by slipping the keel wire through a bore in the weight. The curvature of the keel wire positions the weight beneath the lure body, and also prevents the weight from being pulled off except by conscious effort of the fisherman. If desired, however, the weight may be removed from the keel wire and another weight of different mass replaced on the keel wire, without the use of tools. Replacement of the weight is facilitated by the shape of a terminal bend in the keel wire, which holds the tip end of the keel wire away from the surface of the bore when it is therein, such that the wire tip does not dig into the lead during insertion or removal of the wire. The wire is provided with a curvature arranged to retain the weight after it is installed. Further, the wire is selected to have sufficient spring action or resiliency to allow it to straighten enough to pass through the weight during installation or removal without substantial change in its unstressed shape so that the curved portion weight retaining function is not adversely affected.

These and other aspects of this invention will become apparent to those skilled in the art from the following detailed description taken in conjunction with the accompanying drawings:

DETAILED DESCRIPTION OF THE DRAWINGS

Referring more particularly to the drawings, FIGS. 1-4 illustrate a preferred form of fishing lure 10 constructed according to the present invention. The lure includes a body wire 21 and a keel wire 26, which are formed from one length of spring wire bent at 22 to provide a line attachment loop 23 to which a fishing line 24 is secured.

Figure 1:
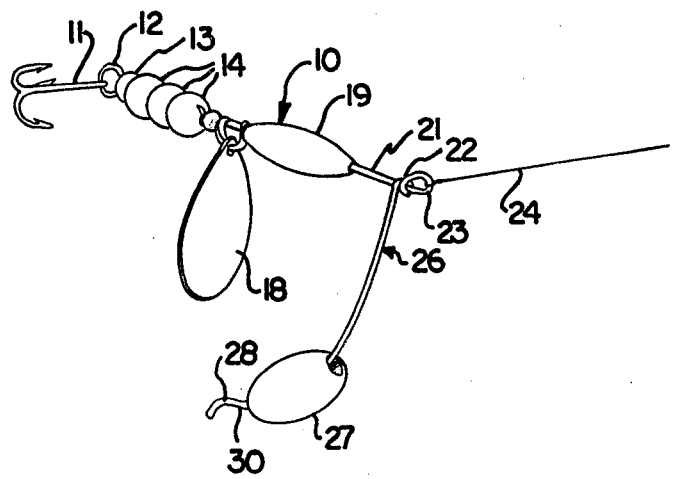
FIG. 1 is a perspective view of a fishing lure constructed in accordance with this invention, showing the relative position of the parts when the lure is being pulled through a body of water.
Figure 2:
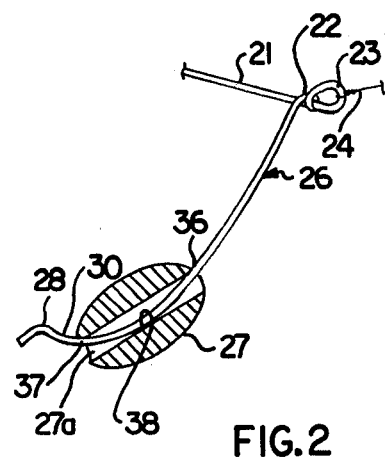
FIG. 2 is a fragmentary, perspective view similar to FIG. 1, illustrating the weight in section.

The body wire 21 is bent at its rearward end to form a hook attachment eye 12, to which is attached a hook 11 of conventional design. While a treble hook is shown in FIG. 1, it will be recognized that this is only by way of example, and not of limitation, and that a single or double hook, with any desired arrangement of barbs as is known to the art, may be substituted for hook 11. To prevent opening of the hook attachment eye 12 and consequent loss of hook 11, the said eye is formed a short distance from the end of the body wire 21 so that the free end of the wire extends back through an attachment eye retainer 13. The retainer is preferably formed of a non-corroding metal and is spherical or conical in shape, and is provided with a sized-to-fit, double width of body wire 21.

Figure 5:
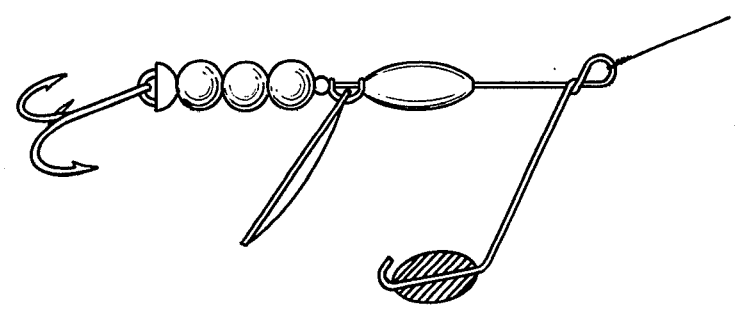
FIG. 5 is a side elevation of a prior art lure which has been manufactured and sold by the applicant.

Also positioned on the body wire 21 are spherical body beads 14 which simulate an insect body, a swivel guard 16, a swivel 17, a spinner 18, and an annular body member 19. The swivel guard 16 and swivel 17 are preferably formed of non-corroding metal, having bores therethrough to pass a width of body wire 21 so as to permit free rotation of the swivel guard and swivel on body wire 21. The spherical body beads 14, spinner 18, and annular body member 19 may be constructed of any suitable materials, and may be colored as desired. The body wire, with the beads 14, spinner 18, and body 19, are arranged substantially the same as corresponding parts of the prior art lure illustrated in FIG. 5, and are illustrated as one representative lure body arrangement to which this invention may be applied.

Mounted on the keel wire 26 is a barrel weight 27 having a bore 27a with a diameter substantially greater than the diameter of the heel wire 21, and sufficient to permit removable mounting of the weight by sliding the weight over terminal bend 28, as will be more fully described hereinafter. Weight 27 is preferably made of lead. Because weight 27 is removably mounted on keel wire 26, any desired size weight 27 may be substituted for another on keel wire 26. As a result, the depth at which lure 10 will run when retrieved may be varied at will.

As shown in FIG. 1, weight 27 is held in position on keel wire 26 a short distance inboard from terminal or reverse bend 28. Weight 27 is freely movable inboard of this position, toward keel-forming bend 22 along keel wire 26, but it is not freely movable outboard of the position shown, over terminal bend 28, as will be more fully described below with reference to FIG. 4.

Keel wire 26 and body wire 21 define a relatively large angle at keel-forming bend 22. Keel wire 26 is provided with a smoothly curved portion 30 spaced from the eye 23 and substantially adjacent to the free end 33 of the keel wire 26. The length of keel wire 26 between body wire 21 and the commencement of said angular bend is approximately 0.5–0.75 times the distance from eye 12 to loop 23, such that, in its usual position, weight 27 is approximately centered beneath annular body member 19. The keel wire 26 extends away from body wire 21 enough to permit free rotation of spinner 18. Further, the keel wire/weight combination is structured so that in most instances when the keel wire encounters an obstacle, the obstacle is either brushed aside or the trailing end of the lure is kicked up to lift the hook clear of the obstacle. In either case, snagging does not normally occur. Further, since the weight is smooth, the weight itself does not normally snag. A further result of this configuration of keel wire 26 is to simulate the trailing legs of an insect, and thus provide attractiveness of the lure for the fish.

Figure 4:
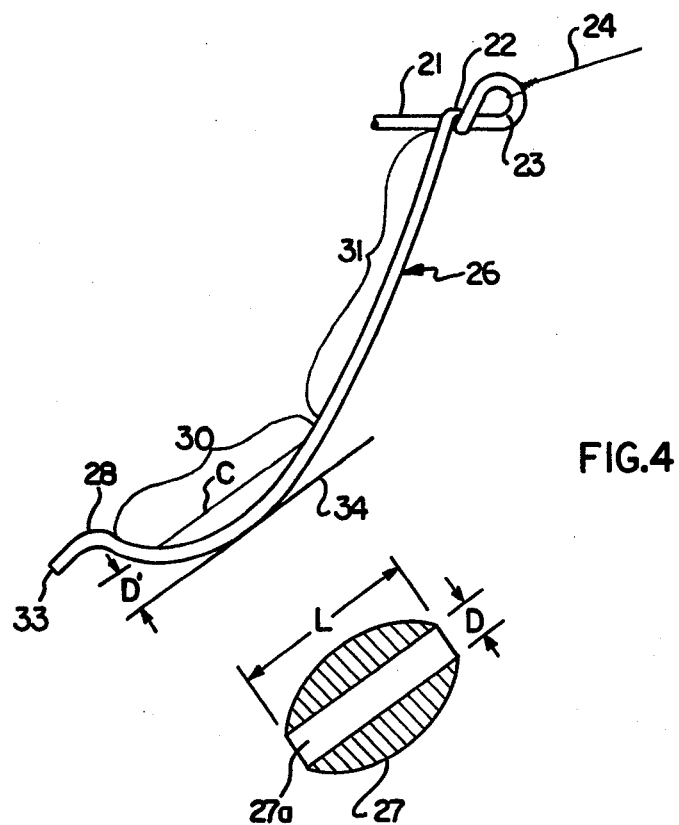
FIG. 4 is a side view of the keel wire and a detached weight, with the latter in section, illustrating the relationship between the opening in the weight and the wire curvature used to removably retain the weight.

Referring to FIG. 4, the weight is normally retained on the keel wire 25 by the curved portion 30 formed in the keel wire substantially adjacent to the reverse bend 28. In FIG. 4, the keel wire is illustrated in its unstressed or free condition, and the weight or sinker 27 is illustrated in section adjacent to but removed from the wire.

The illustrated weight 27 has a through bore or passage 27a having a substantially uniform diameter D and a length L. The keel wire is straight, or formed with a relatively small curvature as it extends along the portion 31 between the loop 23 and the curved portion 30. Along the portion 31, the curvature, if any curvature is provided, is provided with a sufficiently large radius of curvature so that the weight can freely slide along the wire toward the free end. However, the curved portion 30 has a sufficiently small radiis or radii of curvature to prevent the weight from freely slipping off the wire.

In the illustrated embodiment, a curved end portion 30 is formed so that the radius of curvature decreases as the reverse bend 28 is approached a sufficient amount so that a cord C having a length L is perpendicularly spaced from a parallel line 34 tangent to the wire by a distance D' greater than the diameter D of the through passage 27a. Therefore, as the weight moves toward the end of the wire, a position is reached at which the wire engages the weight at the two ends of the bore along one side at 36 and 37 and the opposite side of the bore intermediate its ends at 38 (see FIG. 2).

In order for the weight to move past a position where the diameter D' equals the diameter D, it is necessary for the wire to be bent from its unstressed condition to a more straight shape and friction is developed which resists further movement of the weight toward the end of the wire.

The wire is preferably formed of a corrosion-resistant spring wire, such as stainless steel, which can be easily formed to the required shape but which can elastically bend a substantial amount and thereafter return to its original shape with little or no permanent deformation.

When the weight is to be removed, the weight is pulled along the wire toward its end 33 against the spring action of the wire. This causes the wire to be temporarily straightened by the weight a sufficient amount so that the distance D' equals the diameter D until the weight is pulled off the wire past the reverse bend 28. Because of its elasticity, the wire then returns to a unstressed condition in which all or substantially all of the original curvature returns.

The reverse bend 28 is provided to turn the end 33 of the wire away from the adjacent surface of the weight. This prevents the end 33 of the wire from digging into the weight surface, and is particularly important when a weight is to be installed. The bend 28 provides a smooth surface which slides along the surfaces of the through passage as a weight is installed on the keel wire. During such installation, the movement of the weight along the wire again causes the wire to temporarily straighten until the weight reaches a point along the wire where the distance D' is equal to or less than the diameter D. Because of the smooth surface and the elasticity of the wire, the weight is easily installed by simply pressing it along the wire without the use of any tools.

Because the wire is not excessively strained during installation and removal of the weights, weights can be installed and removed an unlimited number of times without causing a fatigue breakage of the wire.

If after repeated installation of weights, the curvature of the curved portion is reduced to a point where the weight is not sufficiently retained, or if a replacement weight has a hole length-to-diameter relationship which requires a greater curvature to provide weight retention, the user merely slides the weight further up along the wire, and with his fingers bends the wire to a slightly tighter curve until the desired weight retention is obtained. Because the portion 31 of the keel wire 26 is substantially straight, the weight is free to move up along the wire to expose the portion 30 for such bending operation.

Figure 3:
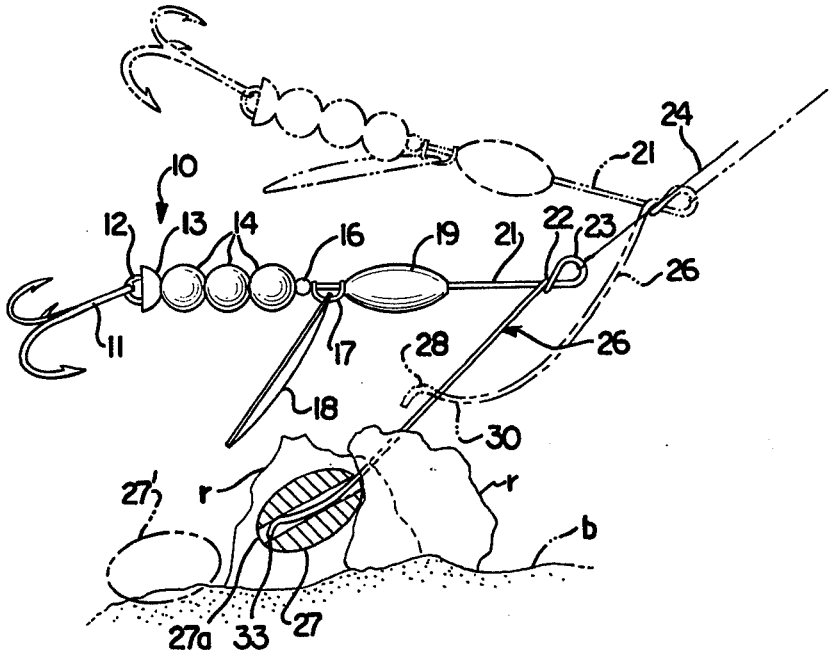
FIG. 3 is a side view showing in solid lines the position of the lure as it strikes and becomes caught in an obstruction, and showing in dashed lines the lure's position as it is pulled free of the obstruction.

The position of weight 27 will cause lure 10 to ride over many obstacles struck by weight 27, without resulting in hook 11 snagging on those obstacles. However, if weight 27 is snagged by an obstacle such as is shown in FIG. 3, lure 10 may be retrieved with no damage to it except for the loss of weight 27, and with the saving in cost of the lure. In this figure, lure 10 is shown in two views. In the solid-line view, weight 27 is held fast in obstacles r, such as a rock, on the bottom of lake bed b. As line 24 is pulled, the force of the pull is transmitted to the keel-wire-bore interfaces 27b, overcoming the restraining forces and pulling keel wire 26 out through bore 27a.

In the cutaway view of weight 27 shown, it will be seen that terminal bend 28 is being pulled through bore 27a. It will also be seen that the end 33 of keel wire 26, as it is defined by terminal bend 28, does not contact the wall of bore 27a. Not only does this facilitate passage of terminal bend 28 through bore 27a when weight 27 is being removed from keel wire 26, but it also facilitates application of weight 27 onto keel wire 26, as when the two are separated.

A dashed line view of lure 10 is shown in this figure, wherein lure 10 has been pulled free of weight 27. The weight 27 has fallen away from obstacles r to lake bottom b, and keel wire 26 has resumed its original unstressed shape and terminal bend 28 has cleared obstacles r. Hook 11 is held clear of obstacles r and thus does not snag thereon. Lure 10 may thus be retrieved, a new weight 27 inserted thereon, and fishing resumed. In order to provide this function of retrieval when the weight is snagged, the amount of curvature and the resistance to bending the wire must be such that the weight can be pulled off the wire with a force less than a force which will break the fishing line. Therefore, the curved portion should not be formed with an excessively small radius of curvature. An excessively small radius of curvature would tend to result in fatigue and breaking of the wire or wearing away of the soft lead of the weight.

It will be understood that, in accordance with the provisions of the patent laws, variations and modifications of the specific devices disclosed herein may be made without departing from the spirit and scope of the invention.

What is claimed is:

1. A fishing lure comprising a body assembly including a hook and connecting means adapted to receive a fishing line, a weight having a hole therethrough, and a keel wire secured to said body assembly depending at a substantial angle therefrom, said keel wire extending through said hole, said keel wire having a curved portion on the side of said weight remote from said body assembly operable to normally retain said weight on said keel wire at a location substantially spaced from said body assembly so as to stabiize said lure as it is pulled through water, said hole having a length and a substantially uniform diameter, said keel wire providing in its unstressed condition a portion along said curved portion wherein a cord equal to the length of said hole is spaced from a parallel tangent line by a distance greater than said hole diameter, said weight when subjected to a predetermined force moving along said curved portion causing temporary straightening thereof and separation of said weight and keel wire, said keel wire having sufficient elasticity to substantially return to its initial shape after said weight is moved axially over said curved portion, keel wire end means for preventing the end of said keel wire from digging into said weight when said weight is moved over said curved portion to both separate said weight and said keel wire and to move said weight onto said keel wire, said end means being a reverse bend between said curved portion and the end of said keel wire, said reverse bend providing a smooth surface operable to slide along the surface of said hole and being sufficiently limited in length and angularity with respect to said curved portion to maintain said end spaced from said surface during its passage through said hole.

2. A fishing lure as set forth in claim 1, wherein the radius of curvature of said curved portion can be changed by bending said keel wire with the user's fingers.

3. A method of producing a fishing lure with a removable and replaceable weight comprising forming a lure with a body having a depending keel wire formed of spring material, forming a smooth curved portion adjacent the free end of said keel wire, and positioning a removable weight having a hole therein on said keel wire by moving said curved portion through said hole, said curved portion being formed so that it provides a cord having a length equal to the length of said hole which is spaced from a parallel tangent line by a distance greater than the diameter of said hole, selecting said spring wire with sufficient elasticity to allow movement of said weight along said curved portion without substantial permanent change in the curvature of said curved portion, and including forming a reverse bend between said curved portion and the end of said keel wire of limited length and angularity with respect to said curved portion to prevent said end from digging into the surface of said hole as said weight is moved over said curved portion.

* * * * *